United States Patent [19]

Brown

[11] Patent Number: 4,854,791
[45] Date of Patent: Aug. 8, 1989

[54] CONTAINER DOOR BARRICADE
[75] Inventor: James T. Brown, Central City, Pa.
[73] Assignee: Bethlehem Steel Corporation, Bethlehem, Pa.
[21] Appl. No.: 182,598
[22] Filed: Apr. 18, 1988
[51] Int. Cl.$^4$ .................. B60P 7/13; B61D 45/00
[52] U.S. Cl. .................................. 410/52; 410/54; 410/94; 105/355
[58] Field of Search .......... 410/52, 54, 71, 72, 410/90, 94, 95, 77, 78; 105/355, 370

[56] References Cited

U.S. PATENT DOCUMENTS

| | | | |
|---|---|---|---|
| 1,631,164 | 6/1927 | Smith | 410/90 X |
| 1,845,594 | 2/1932 | Fildes | 410/72 X |
| 3,071,084 | 1/1963 | Morrison | 410/52 |
| 3,180,281 | 4/1965 | Sherrie et al. | 410/94 X |
| 3,219,218 | 11/1965 | Hand | 410/54 X |
| 3,547,049 | 12/1970 | Sanders | 105/370 X |
| 3,854,423 | 12/1974 | Bridge | |
| 4,091,741 | 5/1978 | Hartkorn | 410/71 |
| 4,092,933 | 6/1978 | Charlton | 410/71 |
| 4,759,294 | 7/1988 | Schuller et al. | 410/71 X |

FOREIGN PATENT DOCUMENTS 695939 10/1964 Canada .................................. 410/94

Primary Examiner—Robert B. Reeves
Assistant Examiner—Dean J. Kramer
Attorney, Agent, or Firm—John I. Iverson

[57] ABSTRACT

A container door barricade system for use on railroad container cars having one or more freight decks adapted to carry cargo containers of different lengths. The door barricade system comprises a plurality of both fixed and pivotal barricade assemblies longitudinally arranged along the length of the freight deck where the pivotal assemblies are operable from ground level at either side of the container car.

15 Claims, 3 Drawing Sheets

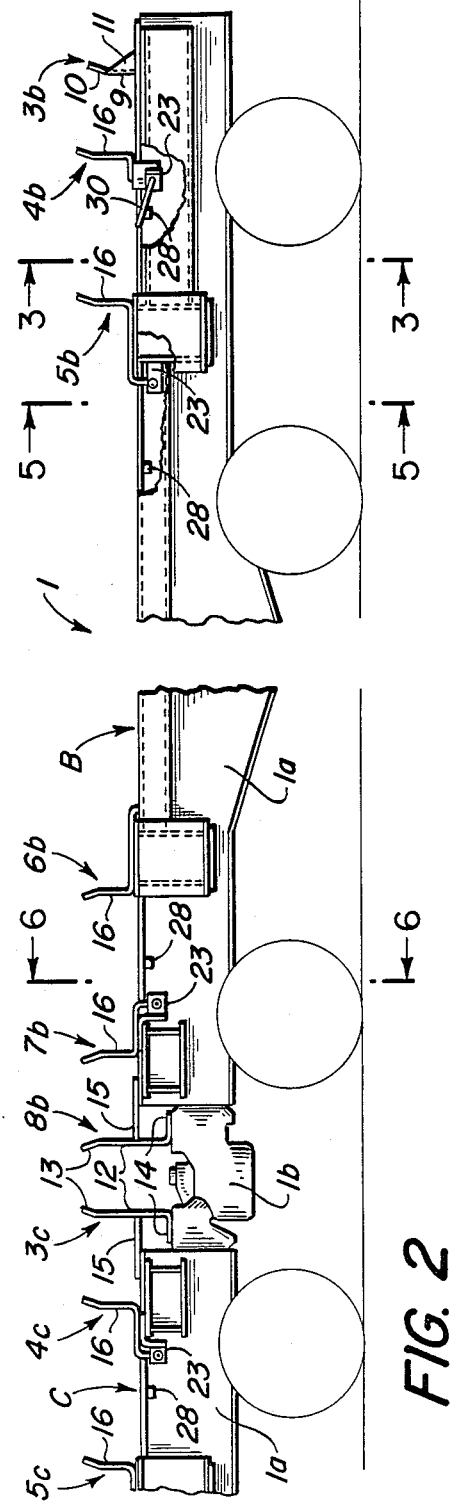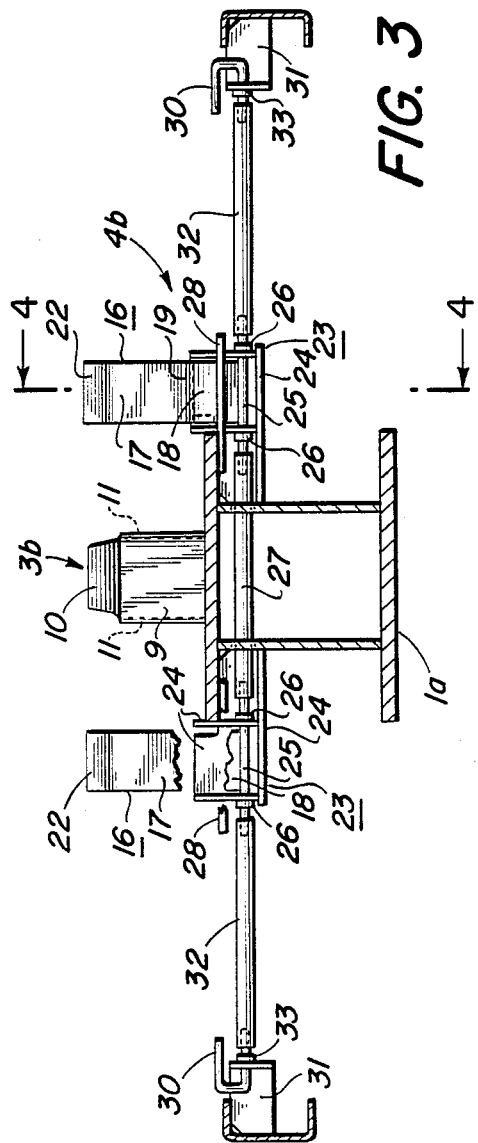

CONTAINER DOOR BARRICADE

BACKGROUND OF THE INVENTION

This invention relates to a container door barricade system. It relates particularly to a container door barricade system for use on a railroad container car having one or more freight decks adapted to carry containers of different lengths.

It is recognized that containerized cargo is often subjected to pilferage as it is being shipped by rail. Such containerized cargo is especially vulnerable as freight cars stand idle along railroad sidings or in freight yards. In the past various container door barricades were developed to prevent unauthorized access to the cargo space of freight containers. Early barricades were often attached directly to the container doors and comprised such devices as chains and/or padlocks to provide security against breaking and entering. More recently container door barricades have been built into the framework of the freight vehicles. Such barricades, appearing to be more effective than the above chains and padlocks, generally comprise upstanding legs which abut directly against the container doors after the container is loaded onto the freight deck. We have found, however, that such frame mounted barricades of the past cannot be adapted to use with containers of different lengths. We have also found the door barricades of the past to be inconvenient and dangerous because their use requires operators to be on the freight deck during loading operations.

SUMMARY OF THE INVENTION

It is therefore an object of this invention to provide a container door barricade system for use on a railroad freight car having one or more freight decks. It is a further object of this invention to provide a container door barricade system which is readily adaptable for use on a railroad container car having one or more freight decks adapted to carry containers of different lengths. It is a further object of this invention to provide a container door barricade system comprising a plurality of pivotal and rigid barricade assemblies arranged longitudinally along the length of a freight deck where rotatable barricade means of the pivotal barricade assemblies may be raised to an active position to secure the container doors or lowered to an inactive position below the level of the freight deck. It is a still further object of this invention to provide linkage enabling the operation of the container door barricade system from ground level at either side of the freight vehicle.

It has been discovered that the foregoing objectives can be attained by providing a container door barricade system having a plurality of fixed and pivotal door barricade assemblies where the pivotal door barricade assemblies spaced along the length of a freight vehicle comprise one or more rotatable "Z" shaped plates interconnected by linkage to provide means for simultaneously rotating the "Z" shaped plates from either side of the freight vehicle.

BRIEF DESCRIPTION OF THE DRAWINGS

FIG. 2 is an enlarged side elevation of an articulated railroad container car with portions removed to show the door barricade system of the invention.

FIG. 3 is a cross-sectional view taken along the lines 3—3 of FIG. 2.

DESCRIPTION OF THE PREFERRED EMBODIMENT

Figure 1:
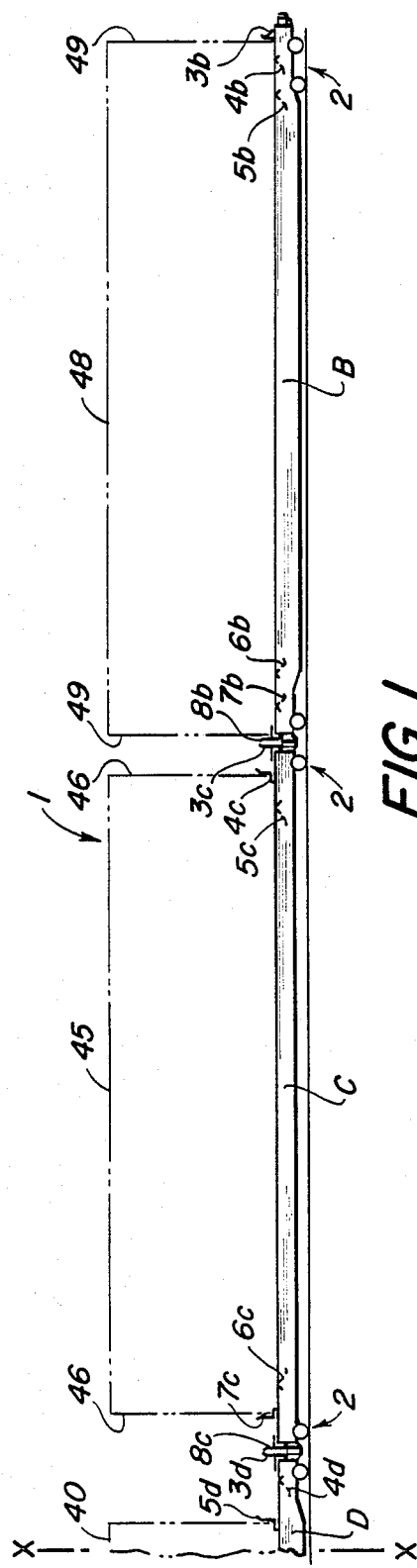
FIG. 1 is a side elevation of an articulated railroad container car showing the door barricade system securing containers of different lengths.
Figure 1A:
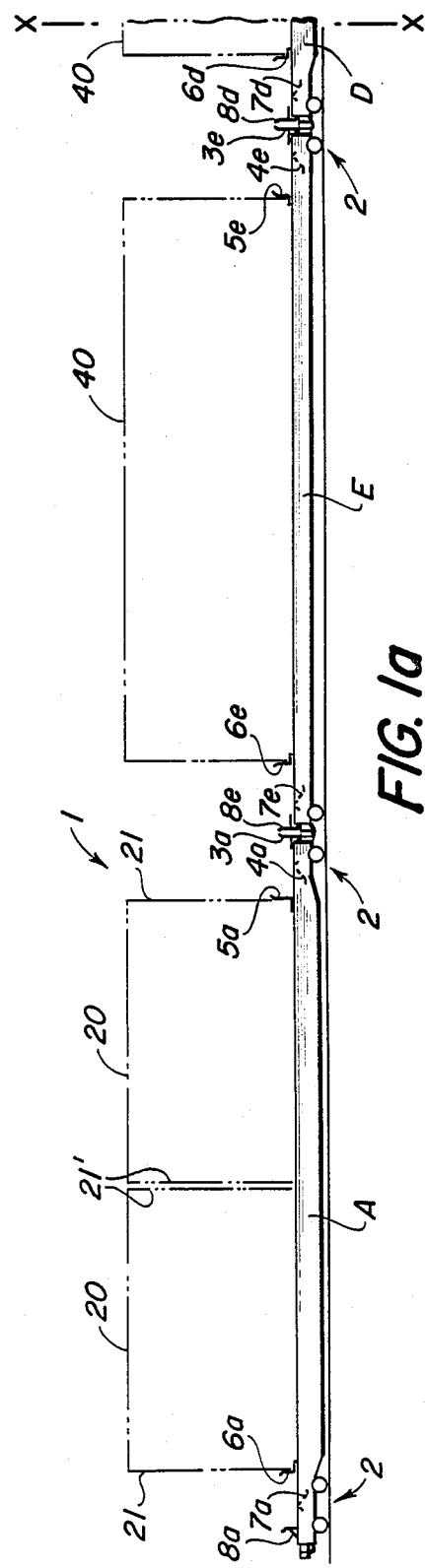
FIG. 1a is a continuation of FIG. 1 at line X—X showing still more containers of different lengths being secured by the door barricade system.
Figure 4:
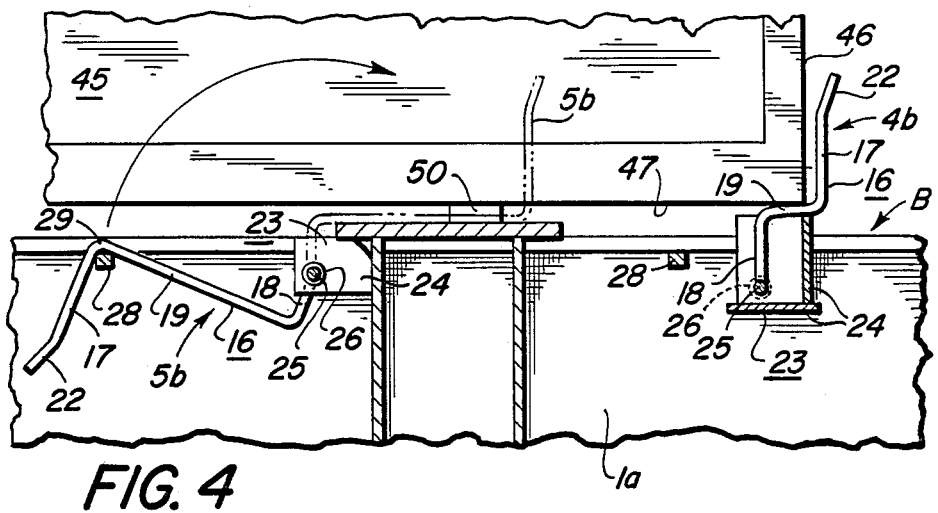
FIG. 4 is a cross-sectional view taken along the lines 4—4 of FIG. 3 showing a container in place on the freight deck.
Figure 5:
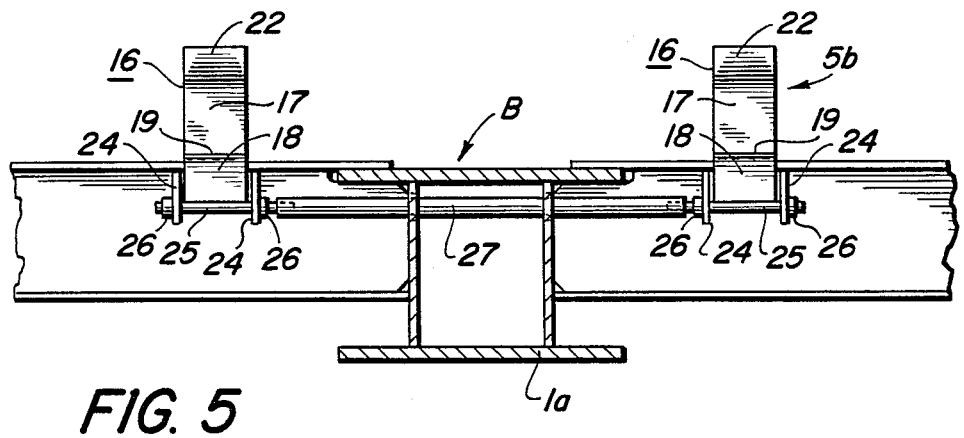
FIG. 5 is a cross-sectional view taken along the lines 5—5 of FIG. 2.

Referring to FIGS. 1 and 1a of the drawings, the preferred embodiment of the door barricade system of this invention comprises a plurality of barricade assemblies 2 longitudinally arranged along the length of an articulated single level railroad container car 1 having freight decks A through E. The freight decks A through E are adapted to carry cargo containers measuring 20, 40, 45, and 48 feet in length. The barricade assemblies 2 comprise both fixed barricade assemblies 3a through 3e and 8a through 8e and pivotal barricade assemblies 4a through 4e, 5a through 5e, 6a through 6e and 7a through 7e.

The following description is directed to the arrangement, structure and operation of the fixed and pivotal barricade assemblies of freight deck B with the understanding that the arrangement, structure and operation of all corresponding barricade assemblies located throughout the freight decks A through E of railroad container car 1 will be similar.

Figure 6:
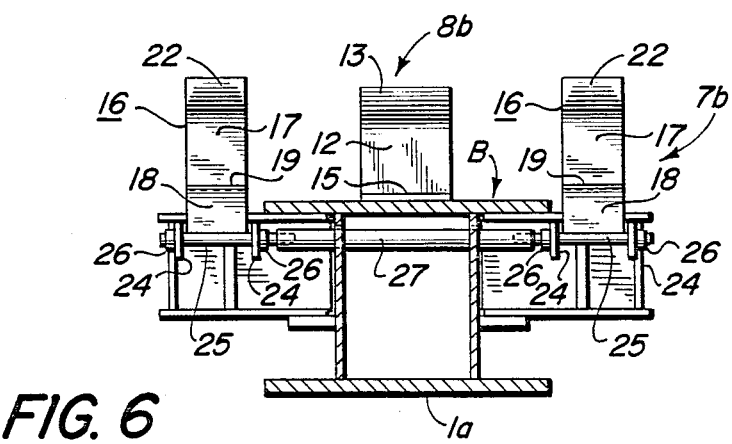
FIG. 6 is a cross-sectional view taken along the lines 6—6 of FIG. 2.

As shown in FIGS. 2, 3 and 6, the container door barricade system 2 of freight deck B comprises a first fixed barricade assembly 3b and a last fixed barricade assembly 8b. The first fixed barricade assembly comprises an upstanding or vertical leg 9 having sufficient length to extend above the bottom edge of the container door on a cargo container being carried on freight deck B. The upstanding leg 9 has at its upper end an inclined portion 10 for guiding containers into position onto the freight deck during loading operations. Triangular stiffeners 11 substantially perpendicular to upstanding leg 9 of the first rigid barricade assembly 3b, extend from the inclined guide portion 10 to the center sill 1a of freight deck B and the barricade assembly 3b is rigidly attached to the center sill 1a by welding or similar means.

The last fixed barricade assembly 8b also comprises an upstanding or vertical leg 12 having sufficient length to extend above the bottom edge of the container door of a cargo container being carried on freight deck B. The upstanding leg 12 has at its upper end an inclined portion 13 for guiding containers into position onto the freight deck and at its lower end a substantially horizontal stiffener 14 extending from the upstanding leg 12 and rigidly attached to the articulated connection 1b of railroad container car 1 by welding or similar means. An intermediate horizontal stiffener 15 also extends from upstanding leg 12 and is rigidly attached to the center sill 1a of freight deck B by welding or similar means.

As shown in FIGS. 1 and 1a, fixed barricade assemblies similar to assembly 3b are always and only used at the first and last barricade assembly positions 3a and 8a of the railroad container car 1. All other fixed barricade assembly positions along the length of container car 1 require the use of fixed barricade assemblies similar to barricade assembly 8b.

Longitudinally arranged along the length of freight deck B between the fixed barricade assemblies 3b and 8b is a plurality of pivotal barricade assemblies 4b, 5b, 6b and 7b. Because the arrangement, structure and operation of the pivotal barricade assemblies 4b through 7b are similar to each other, and because these barricade assemblies vary only dimensionally due to restrictions imposed at each of their respective locations along freight deck B, the following description is applicable to each of the pivotal barricade assemblies 4b through 7b.

As shown in FIGS. 2 through 6 of the drawings, each pivotal barricade assembly comprises one or more "Z" shaped plates 16. Each "Z" shaped plate 16 includes a first, longer, flange 17, a second, shorter flange 18 and a web portion 19 connecting flanges 17 and 18. Flange 17 is long enough to extend above the bottom edge of a container end door and includes an inclined end portion 22 used for guiding containers into position onto the freight deck. Each flange 18 is provided with an end portion that is rotatably connected to a pivot or hinge means 23. The pivot means 23 comprises mounting brackets 24 having openings to accept a rotatable rod or tubular member 25 attached to the end portion of flange 18 by welding or similar means and stops 26 to hold the rod or tubular member 26 within the mounting brackets 24. Transverse linkage in the form of a rod or tubular member 27 extends through openings provided in the center sill 1a of freight car 1 and rotatably interconnects the pivot means 23 of the pivotal barricade assembly. Support members 28 are welded to the framework of the freight deck B at each "Z" shaped plate 16. Each support member 28 is positioned to support its "Z" shaped plate 16 at juncture 29 between flange 17 and web 19 when plate 16 is lowered to its inactive position below the level of the freight deck.

Handles or hand grips 30, as shown on FIG. 3, may be provided to facilitate raising or lowering the "Z" shaped plates 16. The handles are rotatably connected to the first and last pivot means 23 of the pivotal barricade assembly. Each handle assembly comprises a mounting bracket 31 attached to the structure of the freight deck by welding or other means, a handle 30 supported within openings provided in the mounting bracket 31, stops 33 to hold handle 30 in place and a rod or tubular member 32 rotatably connecting the handle 30 to the rotatable member 25 of the pivot means 23.

Referring again to FIGS. 1 and 1a, as previously stated, the freight decks are adapted to carry 20, 40, 45 and 48 foot long cargo containers. Freight deck B is shown carrying a 48 foot long container at 48, freight deck C is shown carrying a 45 foot long container at 45, freight decks D and E are shown carrying 40 foot long containers at 40 and freight deck A is shown carrying two 20 foot long containers at 20. Prior to loading container 48 onto freight deck B an operator lowers the "Z" shaped plates 16 of pivotal barricade assemblies 4b, 5b, 6b and 7b. With the pivotal barricade assemblies resting upon their support members 28 in the lowered or inactive position below freight deck B, container 48 is lowered into position onto the freight deck between fixed barricade assemblies 3b and 8b with the upstanding legs 9 and 12 securing the container end doors 49 in a closed position.

This loading operation is repeated at each of the freight decks and various pivotal barricade assemblies are either raised or lowered to adapt to the different length containers. For example, at freight deck C the operator raises the "Z" shaped plates 16 of pivotal barricade assemblies 4c and 7c and lowers the "Z" shaped plates 16 of assemblies 5c and 6c. Container 45 is then lowered onto freight deck C between pivotal barricade assemblies 4c and 7c and their flanges 17 secure the container end doors 46 in a closed position to prevent unauthorized access to the cargo space. As more clearly shown in FIG. 4, the upstanding flange 17 of "Z" shaped plate 16 secures container door 46 in a closed position while the bottom 47 of container 45 either rests upon web 19 or is supported slightly above web 19 by support means 50 and the weight of container 45 prevents rotating the "Z" plates 16 from their protective position while the container is carried on the freight deck.

Likewise, as shown at freight decks D and E, the "Z" shaped plates 16 of pivotal barricade assemblies 4d or 4e and 7d or 7e are lowered to their inactive position below the freight deck and containers 40 are lowered onto the freight decks between the upstanding flanges 17 of the pivotal barricade assemblies 5d or 5e and 6d or 6e which are located adjacent to the transverse center line of the freight deck.

Freight deck A is shown carrying two 20 foot long containers 20 having their container end doors secured by the same procedure described for a 40 foot long container. However, when two 20 foot long containers are carried on a freight deck, the container end doors 21 are either secured by the upstanding flanges 17 of pivotal barricade assemblies as shown at 5a and 6a, or the container end doors are secured by their close proximity when adjacent to each other as shown at 21'.

It is apparent from the preceding description that during loading operations the arrangement of the fixed pivotal door barricade assemblies along freight decks A through E of the railroad container car 1 allows the selective raising or lowering of the door barricade assemblies to accept various size containers as they are being loaded onto the freight decks. It is also apparent that the interconnecting linkage of the pivotal door barricade assemblies allows a single operator to adapt the door barricade system to a particular size container while the operator is standing on ground level at either side of the freight vehicle convenient to him. Such convenience of operation, and especially the ground level operation greatly reduces the risk of injury to personnel during loading operations.

While this invention has been illustrated and described in certain embodiments, it is understood that other embodiments and changes may be made without departing from the invention as set forth.

I claim:

1. A container door barricade system for use with rectangular, end door cargo containers loaded on a freight deck of a freight vehicle, said container door barricade system comprising:
   (a) a fixed door barricade assembly at the front and back ends of the freight deck, and
   (b) at least one pivotal door barricade assembly positioned along the length of said freight deck between said fixed door barricade assemblies, said pivotal door barricade assembly capable of being rotated about a horizontal axis to an upstanding position above said freight deck and parallel to said fixed door barricade assemblies thereby blocking the doors of the cargo container or rotated about a horizontal axis to an inactive stored position at or below the level of the freight deck.

2. The invention of claim 1 in which each pivotal barricade assembly of (b) comprises:
   (a) one or more rotatable plates pivotally attached and transversely spaced along the width of said freight deck, each rotatable plate having a door barricade portion capable of being rotated about a horizontal axis to an upstanding position above said freight deck thereby blocking the doors of a cargo container or rotated about a horizontal axis to an inactive stored position at or below the level of the freight deck,
   (b) at least one pivot means, said pivot means having:
      (i) a rotating member attached to said rotatable plate,
      (ii) mounting means attached to the structure of said freight vehicle, said mounting means provided with openings to support said rotating member, and
      (iii) retaining means to maintain said rotating member within said mounting means; and
   (c) linkage interconnecting the rotating member of each pivot means of the barricade assembly said linkage enabling the simultaneous rotation of the rotatable plates of said barricade assembly.

3. The invention of claim 2 in which the rotatable plates of the pivotal barricade assemblies are "Z" shaped in configuration, each "Z" shaped plate comprising a first flange member substantially parallel to a second flange member and a web member substantially perpendicular to said first and second flange members, said first flange member has an inclined end portion for guiding containers onto the freight deck of said freight vehicle and said second flange member has an end portion attached to the rotating member of said pivot means.

4. The invention of claim 2 in which each rotatable plate of the pivotal barricade assemblies is provided with a support means to support said rotatable plate in its stored position below the level of said freight deck, each said support means comprising a rod or bar like member attached to the structure of said freight vehicle, said support means being substantially parallel to the axis of rotation of said rotatable plate and longitudinally spaced therefrom below the level of said freight deck.

5. The invention of claim 2 in which the pivotal barricade assemblies are provided with a handle means, each handle means comprising a mounting means attached to the structure of said freight vehicle, said mounting means provided with openings to support a hand grip portion of said handle means, a retaining means to maintain said hand grip portion within said mounting means, and linkage rotatably connecting said hand grip portion to the rotatable member of the pivot means of said pivotal barricade assemblies.

6. A container barricade system for use with rectangular, end door cargo containers of different lengths loaded on the freight decks of a plurality of articulated freight vehicles, said container door barricade system comprising:
   (a) a fixed door barricade assembly located at the front end of the first articulated freight vehicle and at the back end of the last articulated freight vehicle,
   (b) intermediate fixed door barricade assemblies located at each articulated connection end of each freight deck of each said articulated freight vehicle, and
   (c) at least one pivotal door barricade assembly positioned along the length of each said freight deck between said fixed door barricade assemblies, said pivotal door barricade assembly capable of being rotated about a horizontal axis to an upstanding position above said freight deck and parallel to said fixed door barricade assemblies thereby blocking the doors of a cargo container or rotated about a horizontal axis to an inactive stored position at or below the level of said freight deck.

7. The invention of claim 6 in which each pivotal barricade assembly of (c) comprises:
   (a) one or more rotatable plates pivotally attached and transversely spaced along the width of said freight deck, each rotatable plate having a door barricade portion capable of being rotated about a horizontal axis to an upstanding position above said freight deck thereby blocking the doors of a cargo container or rotated about a horizontal axis to an inactive stored position at or below the level of the freight deck,
   (b) at least one pivot means, said pivot means having:
      (i) a rotating member attached to said rotatable plate,
      (ii) mounting means attached to the structure of said freight vehicle, said mounting means provided with openings to support said rotating member, and
      (iii) retaining means to maintain said rotating member within said mounting means; and
   (c) linkage interconnecting the rotating member of each pivot means of the barricade assembly said linkage enabling the simultaneous rotation of the rotatable plates of said barricade assembly.

8. The invention of claim 6 in which the rotatable plates of the pivotal barricade assemblies are "Z" shaped in configuration, each "Z" shaped plate comprising a first flange member substantially parallel to a second flange member and a web member substantially perpendicular to said first and second flange members, said first flange member has an inclined end portion for guiding containers onto the freight deck of said articulated railroad car and said second flange member has an end portion attached to the rotating member of said pivot means.

9. The invention of claim 6 in which each rotatable plate of the pivotal barricade assemblies is provided with a support means to support said rotatable plate in its stored position below the level of said freight deck, each said support means comprising a rod or bar like member attached to the structure of said freight vehicle, said support means being substantially parallel to the axis of rotation of said rotatable plate and longitudinally spaced therefrom below the level of said freight deck.

10. The invention of claim 6 in which the pivotal barricade assemblies are provided with a handle means, each handle means comprising a mounting means attached to the structure of said freight vehicle, said mounting means provided with openings to support a hand grip portion of said handle means, a retaining means to maintain said hand grip portion within said mounting means, and linkage rotatably connecting said hand grip portion to the rotatable member of the pivot means of said pivotal barricade assemblies.

11. The invention of claim 6 in which the intermediate fixed door barricade assemblies comprise:
   (a) an upstanding leg having an inclined end portion for guiding a container onto the freight deck and a lower end portion having a substantially horizontal stiffening leg attached to the articulated connection of said articulated railroad car, and
   (b) an intermediate substantially horizontal stiffening leg attached to the structure of the freight deck of said articulated railroad car.

12. A container door barricade assembly for use with rectangular, end door cargo containers loaded on the freight deck of a freight vehicle, said container door barricade comprising:
   (a) at least one rotatable plate spaced along the width of said freight deck said rotatable plate having a door barricade portion capable of being rotated about a horizontal axis to an upstanding position above said freight deck and perpendicular to the longitudinal axis of said freight vehicle, thereby blocking the doors of a cargo container or rotated about a horizontal axis to an inactive stored position at or below the level of the freight deck,
   (b) at least one pivot means, said pivot means having:
      (i) a rotating member attached to a corresponding rotatable plate (a),
      (ii) mounting means attached to the structure of said freight vehicle, said mounting means provided with openings to support said rotating member within said mounting means, and
      (iii) retaining means to maintain said rotating member within said mounting means;
   (c) linkage interconnecting the rotating members of said pivot means (b) said linkage enabling the simultaneous raising or lowering of said rotatable plate.

13. The invention of claim 12 in which the rotatable plates (a) of the container door barricade are "Z" shaped in configuration, each "Z" shaped plate comprising a first flange member substantially parallel to a second flange member and a web member substantially perpendicular to said first and second flange members, said first flange member has an inclined end portion for guiding containers onto the freight deck of said freight vehicle and said second flange member has an end portion attached to the rotating member of said pivot means.

14. The invention of claim 12 in which each rotatable plate (a) of the container door barricade is provided with a support means to support said rotatable plate in its stored position below the level of said freight deck, each said support means comprising a rod or bar like member attached to the structure of said freight vehicle, said support means being substantially parallel to the axis of rotation of said rotatable plate and longitudinally spaced therefrom below the level of said freight deck.

15. The invention of claim 12 in which the container door barricade is provided with a handle means, the handle means comprising a mounting means attached to the structure of said freight vehicle, said mounting means provided with openings to support a hand grip portion of the handle means, a retaining means to maintain said hand grip portion within said mounting means, and linkage rotatably connecting said hand grip portion to the rotatable member of the pivot means of the said container door barricade.

* * * * *